United States Patent [19]
Gelman

[11] Patent Number: 5,402,192
[45] Date of Patent: Mar. 28, 1995

[54] SIMPLIFIED MIRROR SYSTEM FOR CONTOUR PROJECTOR

[75] Inventor: Boris Gelman, Fairport, N.Y.

[73] Assignee: Optical Gaging Products, Inc., Rochester, N.Y.

[21] Appl. No.: 295,095

[22] Filed: Aug. 24, 1994

[51] Int. Cl.⁶ .......................................... G03B 21/28
[52] U.S. Cl. ...................................... 353/78; 353/80; 353/99; 356/391
[58] Field of Search ...................... 353/78, 77, 74, 99, 353/98, 79, 80, 65, 66, 67; 356/376, 391; 359/369

[56] References Cited
U.S. PATENT DOCUMENTS

| | | | |
|---|---|---|---|
| 4,101,194 | 7/1978 | Miyazaki et al. | 359/369 |
| 4,223,986 | 9/1980 | Choate | 353/80 |
| 5,307,098 | 4/1994 | Okita | 359/369 |

OTHER PUBLICATIONS

Müller, MP 320 Measuring Projector, Jena Rev. (Germany) No. 5 (1970) pp. 285–286.

Primary Examiner—William A. Cuchlinski, Jr.
Assistant Examiner—William C. Dowling
Attorney, Agent, or Firm—Shlesinger, Fitzsimmons & Shlesinger

[57] ABSTRACT

The contour image of a workpiece is projected by a conventional lens system onto a first mirror lying in a plane inclined at other than 90° to the optical axis of the lens system. This image is reflected directly (i.e., without the use of any relay lenses) to a second mirror that is spaced from and lies in a plane normal to that containing the first mirror; and from there the image is reflected directly to a third mirror spaced from and lying in a plane normal to each of said first and second mirrors. The third mirror directs an upright and unreversed image directly onto the screen of the projector along an axis parallel to the optical axis of the lens system.

9 Claims, 4 Drawing Sheets

SIMPLIFIED MIRROR SYSTEM FOR CONTOUR PROJECTOR

BACKGROUND OF THE INVENTION

This invention relates to contour projectors, and more particularly to a simplified mirror system for such projectors.

In its simplest form, the typical horizontal contour projector consists of a light source, a magnification lens system, a single mirror onto which an image of a workpiece is projected or directed by the lens system, and a projection screen onto the rear surface of which the image is projected by reflection from the mirror. When a workpiece is interposed between the light source and the magnification lens system, a profile of the workpiece is projected onto the face of the mirror, and is reflected therefrom onto the back of the projection screen for observance by a person standing in front of the screen. A major problem with this type of contour projector, however, is that the observed image is upside down and reversed (left to right) with respect to the face or surface of the workpiece onto which the light source is directed. This makes it very difficult for the operator of the projector to interpret the image and to manipulate the object in a desired manner.

There are several ways to erect the image which is projected by the above-noted system onto the projection screen. One way, which often is employed in telescopes, is to utilize a so-called Poro prism system wherein two spaced prisms are disposed at right angles to each other, and are interposed between the above-noted magnification lens and single mirror. The Poro prism system which embodies four different reflecting surfaces, would then project onto the mirror, and from the mirror to the back of the projection screen, an upright and unreversed image of the workpiece. The disadvantage of using the two Poro prisms is that it introduces four extra reflecting surfaces, thereby requiring expensive additional components, and contributing to undesirable loss of light. Instead of using prisms, the above-noted four extra reflecting surfaces could, of course, be in the form of four separate, front-surface mirrors.

A second approach is to include a second mirror interposed between the magnification lens and the screen, in which case the two mirrors would be mounted in intersecting, right angular planes, so that the image from the magnification lens system would be directed onto one surface of the two mirrors, and would be reflected from that surface to the surface of the second mirror, which in turn would reflect the image onto the rear of the projection screen. The problem with this approach is that while this inverts the image so that it is upright compared to the workpiece, it nevertheless produces a reversed image in which the left side of the workpiece is shown at the right side of the image and vice versa. A reversal of the image could be corrected by substituting for one of these two mirrors an Amici prism, or an equivalent roof mirror system. Although this reduces the total number of reflecting surfaces, as compared to the use of the above-noted Poro prism system, a roof arrangement is difficult to produce, and any angular errors are enhanced. Moreover, there is a seam in the image where the roof peak intersects the light beam. The introduction of any such seam in the image is very objectionable in a gaging application.

Instead of using a simplified mirror system, most conventional contour projectors utilize a series of mirrors in combination with several series of relay lenses, which enable projection of an image along a series of axes lying in a common plane. The U.S. Pat. No. 4,223,986, for example, employs in one embodiment of a contour projector three mirrors and a combination of relay lenses for projecting onto a screen an upright and unreversed contour image of a workpiece. However, not only are a number of relay lenses required to effect the desired projection, but the transmission of the image in a common plane requires the use of larger equipment to produce the upright and unreversed contour image.

It is an object of this invention, therefore, to provide for contour projectors of the type described an improved, simplified mirror system which obviates the above-noted problems, and which requires the use of only three mirrors for projecting onto a projection screen an upright and unreversed image of a workpiece, and without the introduction of any undesirable seams in the image.

Still another object of this invention is to provide for contour projectors of the type described an improved, simplified mirror system which eliminates the need to employ relay lenses with the mirrors.

A still further object of this invention is to provide a contour projector mirror system which, in essence, forms the elements of a corner-cube reflector having three mutually perpendicular reflective surfaces, and whereby the beam is contained on each mirror without encountering any of their intersections.

Other objects of this invention would be apparent hereinafter from the specification and from the recital of the appended claims, particularly when read in conjunction with the accompanying drawings.

SUMMARY OF THE INVENTION

In a contour projector machine, a workpiece is interposed between a contour illuminator lamp and a magnifying lens system, which projects an enlarged image of the workpiece along a first axis (the optical axis of the lens system) onto the reflective surface of a first mirror which lies in a plane inclined to the first axis. The first mirror rotates the image partially about the first axis and projects the partially rotated image along a second axis transversely onto the reflective surface of a second mirror lying in a plane normal to the plane containing the first mirror. The second mirror rotates the image further about the second axis and projects it along a third axis transversely of the second axis onto the face of a third mirror lying in a plane normal to each of the two planes containing the first and second mirrors. The third mirror rotates the image further, now 180° relative to the optical axis of the lens system, and projects an upright and unreversed image of the workpiece along an axis parallel to the first axis and onto the projector's screen.

THE DRAWINGS

BRIEF DESCRIPTION OF THE PREFERRED EMBODIMENT

Figure 1:
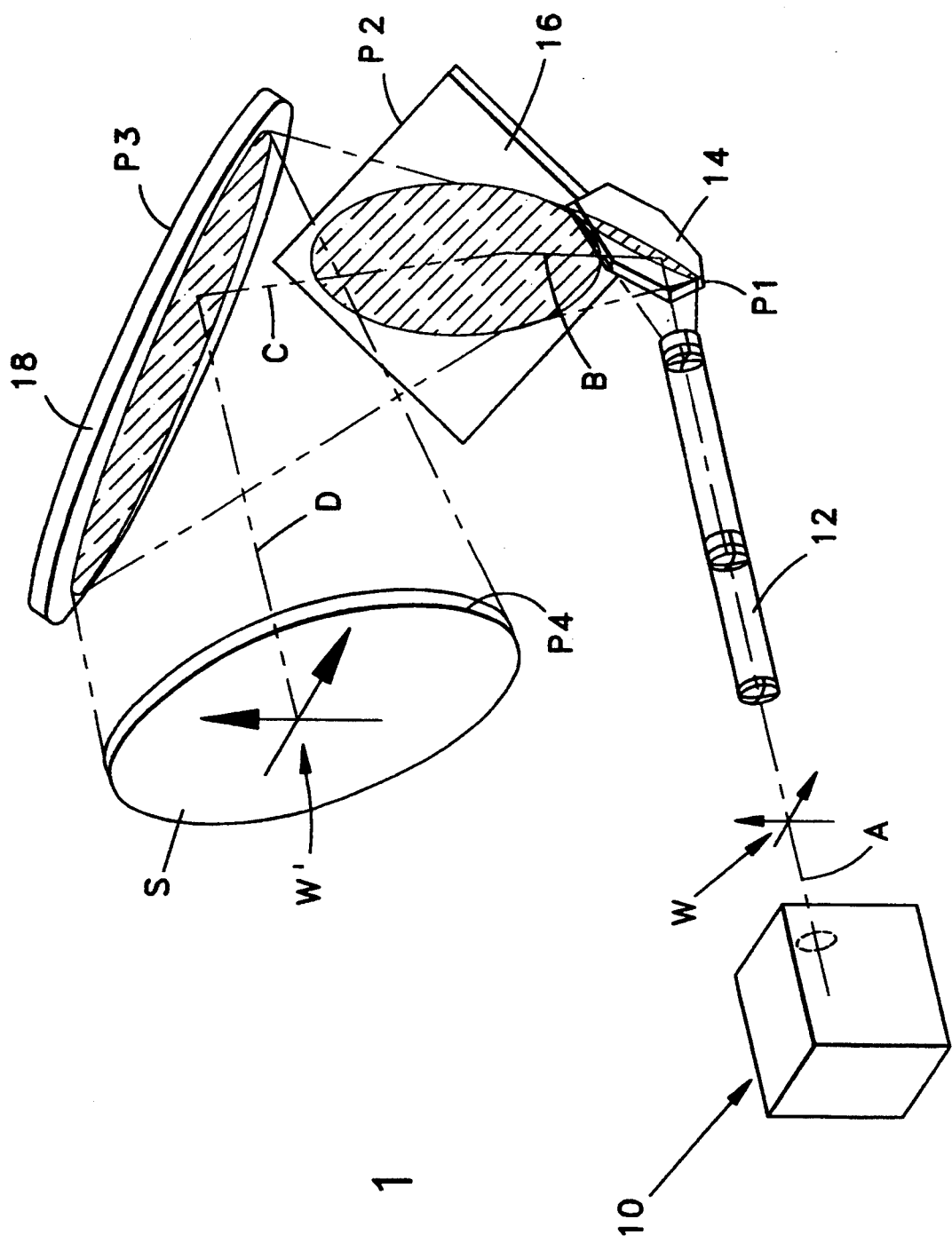
FIG. 1 is a perspective view illustrating diagramatically the principal parts of the simplified mirror system which forms the subject matter of this invention.

Referring first to FIG. 1, 10 denotes a simple light source or illumination system, which directs a beam of light along axis A onto the face of a workpiece W, which in FIG. 1 is denoted by two intersecting arrows. The contour image of the workpiece W is projected through a conventional magnification lens system 12 (e.g., a zoom lens system) and along axis A onto the face or reflective surface of a first mirror 14, which lies in a first plane (for example P1) that is inclined to the axis A. The image in turn is reflected from the face of mirror 14 along an axis B onto the face of a second mirror 16, which is mounted in a plane P2, which is inclined essentially at a right angle to the plane P1. The image of the workpiece W is again reflected along an axis C from the face of the second mirror 16 onto the face of a third mirror 18, which is mounted in a plane P3 extending at right angles to both planes P1 and P2. From the face of mirror 18 the image is projected or reflected along an axis D, parallel to axis A, onto the rear face or surface of a projection screen S, which in practice is mounted in a plane P4 inclined at right angles to the axis D. The image W' appearing on the face of screen S, therefore, is an enlarged, upright, unreversed image of the workpiece W.

Figure 2:
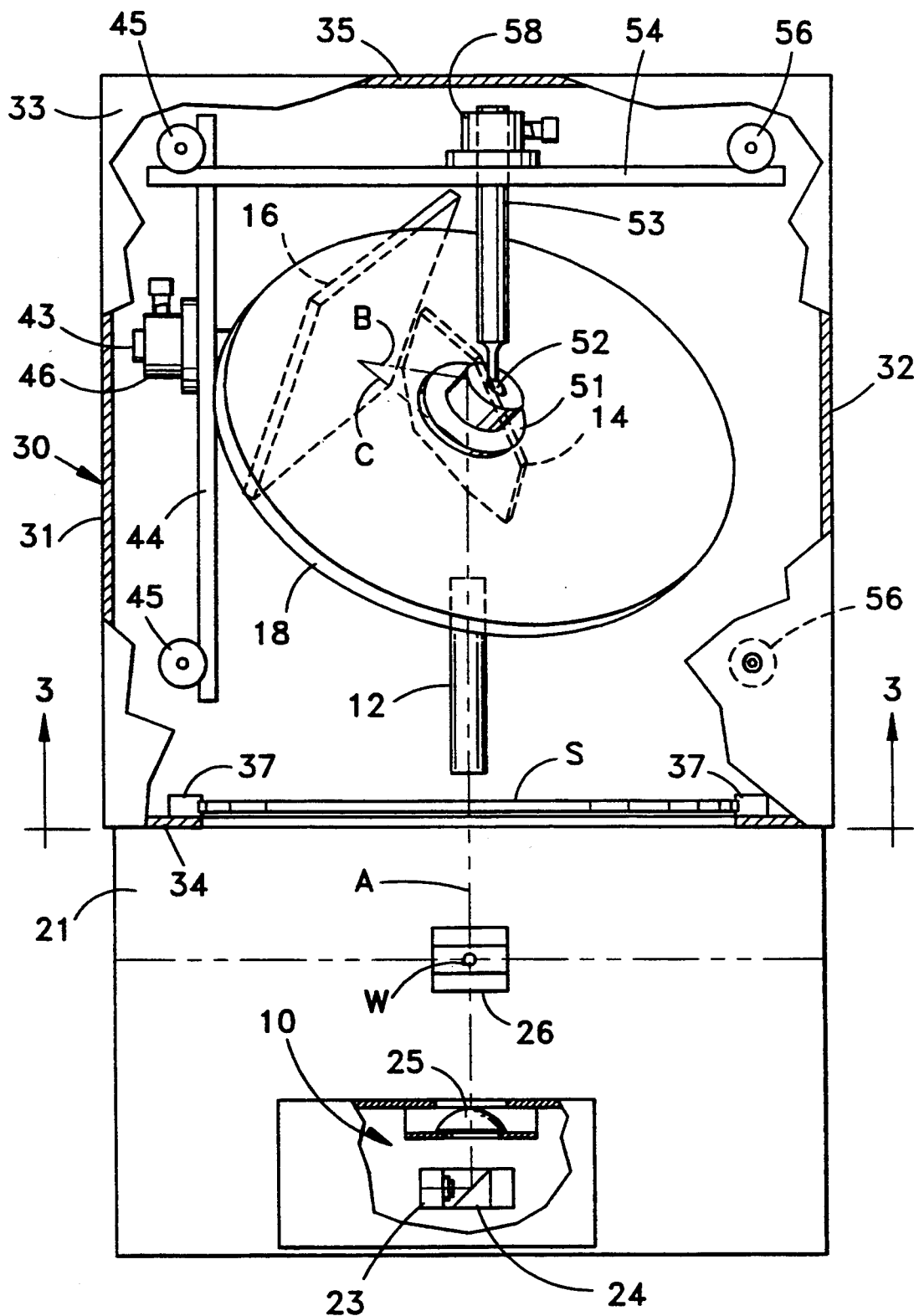
FIG. 2 is a top plan view of a simplified mirror system for a contour projector made according to one embodiment of this invention.
Figure 3:
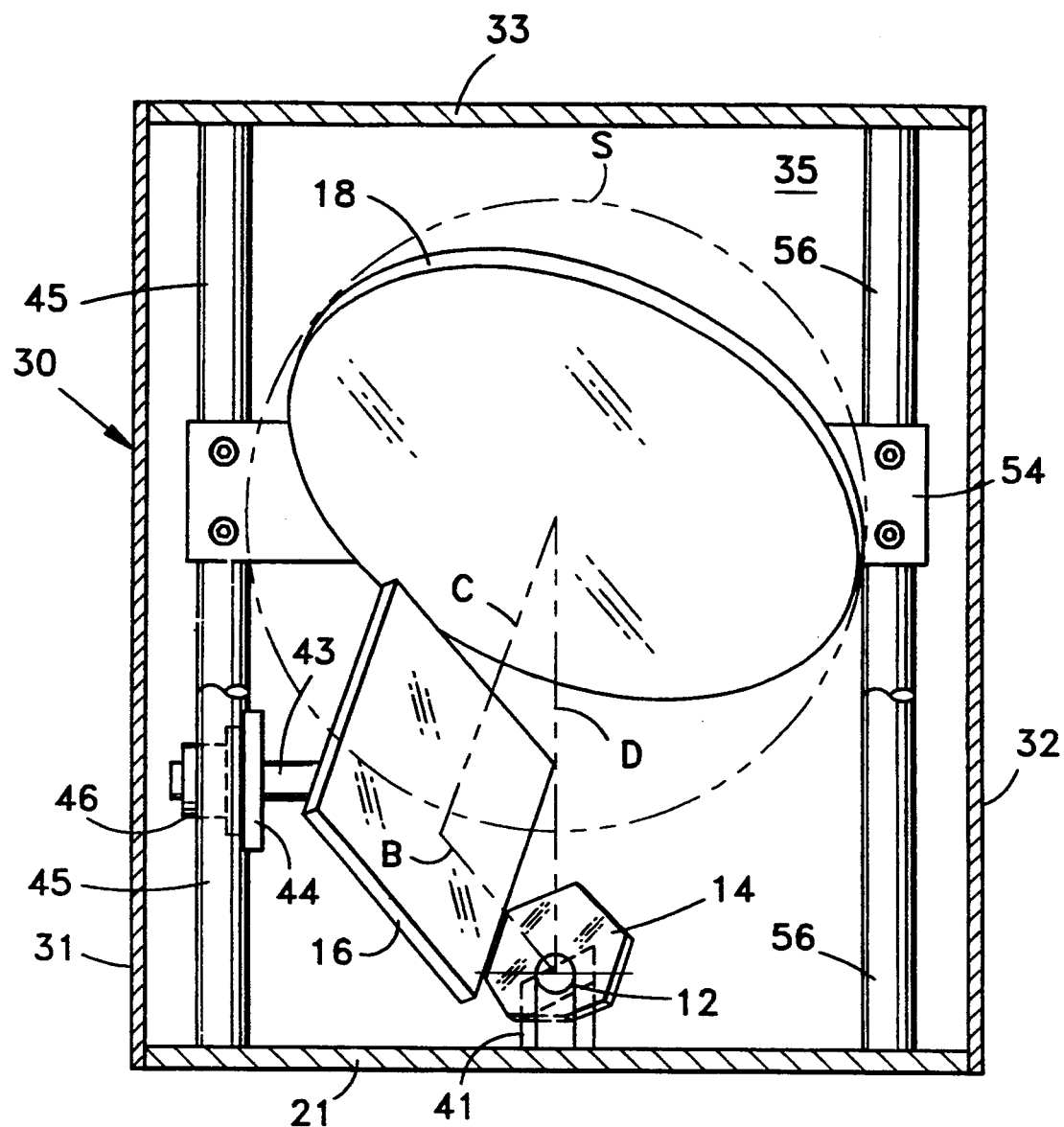
FIG. 3 is a fragmentary sectional view taken generally along the line 3—3 in FIG. 2 looking in the direction of the arrows.
Figure 4:
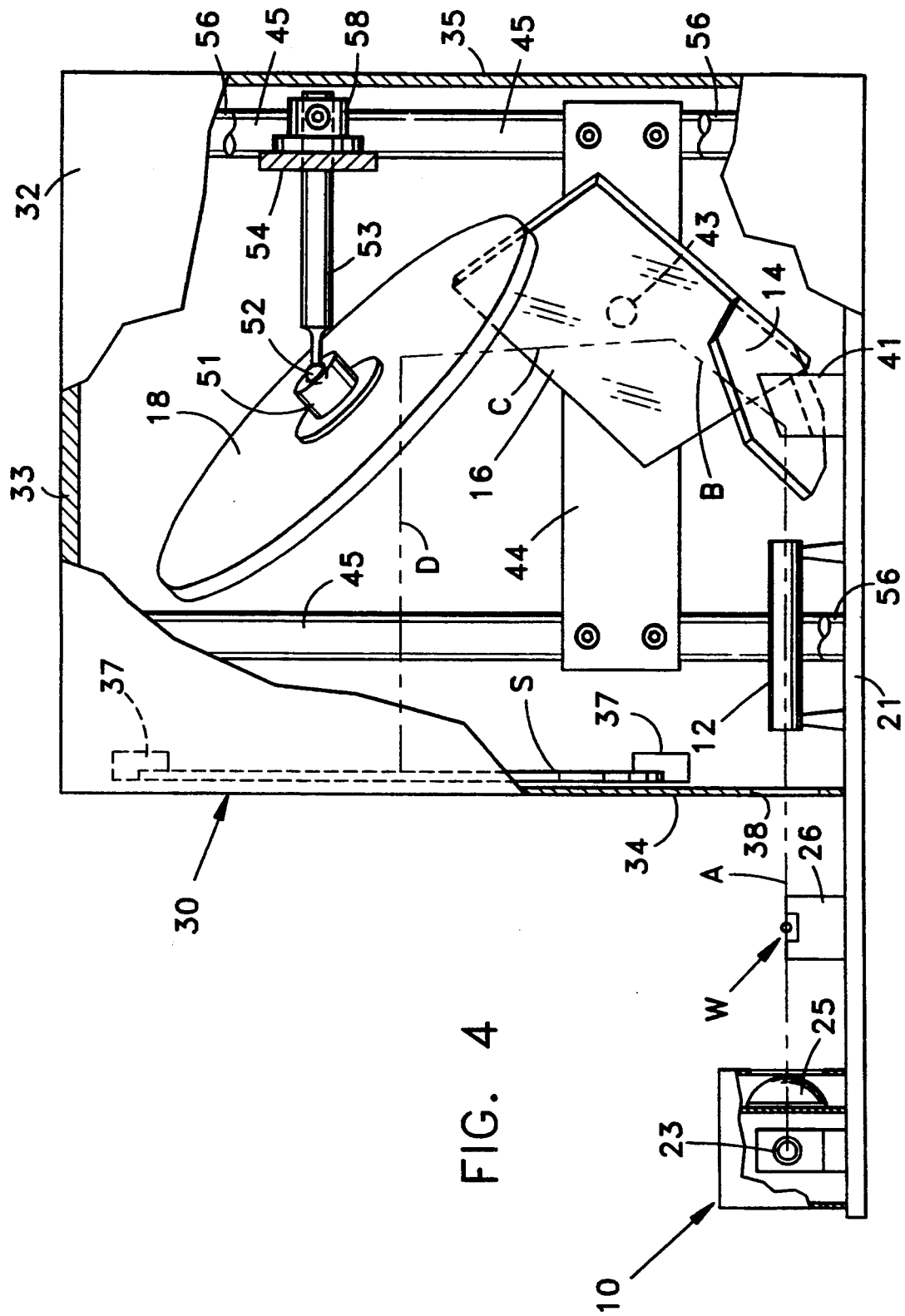
FIG. 4 is a fragmentary side elevational view of the system as seen when looking at the right side thereof as shown in FIG. 3, and with parts of the system being broken away and shown in section.

Referring now to FIGS. 2 to 4, wherein like numerals are employed to denote elements similar to those referred to in FIG. 1, 21 denotes the base plate of a contour projector. Secured on plate 21 adjacent one end thereof is a conventional light source 10 in the form of an emitter 23 (FIGS. 2 and 4) which projects a beam of light onto the inclined surface of the reflector 24. Reflector 24 directs the beam of light through a lens 25 toward a workpiece W, which is secured in a conventional manner on a work support 26 that is mounted on plate 21 adjacent to the light source 10. Light from the source 10 shining on the work W creates an image of the contour of the work; and this image is directed along the axis A to the lens system 12.

In the embodiment illustrated, the lens system 12 is mounted in a mirror housing 30 comprising a pair of spaced, parallel sidewalls 31 and 32, which are secured to and project upwardly from the longitudinal side edges of base 21 in spaced, parallel relation to each other. Housing 30 includes a top wall 33 which is secured to and extends at right angles between the upper edges of the sidewalls 31 and 32, and has front and rear walls 34 and 35, respectively, which extend parallel to each other and at right angles between the housing sidewalls 31 and 32, and its top wall 33. The front wall 34 of housing 30 has therein a large, circular, observation opening, which registers with a large, circular screen S, which is secured by brackets 37 to the inside of wall 34. Wall 34 also has therethrough adjacent its lower end an opening 38, which registers with the light source 10 and the lens system 12 in order to enable transmission of an image of a workpiece W along axis A to the lens system 12.

Within housing 30 the mirror 14 is secured at the rear surface thereof to the upper end of a stationary support 41 (FIGS. 3 and 4), which at its lower end is secured on plate 21. Support 41 retains mirror 14 in a first plane (plane P1 in FIG. 1), which is inclined horizontally and vertically relative to the optical axis A of the lens system 12. This inclination causes the image, which falls on the reflective face of mirror 14, to be rotated slightly relative to the axis A of the projected image. The beam of light falling on the face of mirror 14 is then reflected along the axis B, transversely of the axis A, onto the reflective surface of the second, larger mirror 16. The back of mirror 16 is secured to the inner end of a rod 43, the outer end of which extends through a bracket 44, which is supported by a pair of vertical posts 45 in housing 30 adjacent one side thereof. The outer end of rod 43 is adjustably secured in a cylindrical hub 46 which is fastened to the back of the bracket 44. Mirror 16 is thus adjusted until it is positioned in a plane (P2 in FIG. 1), which is disposed normal or at right angles to the plane P1 containing mirror 14.

The image or light beam striking the reflective surface of mirror 16 is reflected or projected along the axis C, transversely of the axis B, onto the reflective face of still a larger mirror 18. The rear surface of mirror 18 is fastened by a universal fitting 51 to a spherically shaped head or knuckle 52 formed on the inner end of a rod 53, the outer end of which extends through another bracket 54 that is fixed at opposite ends thereof to one of the posts 45, and to one of two additional vertical posts 56 that are secured in housing 30 adjacent the side thereof remote from the posts 45. As in the case of the rod 43, the rod 53 is adjustably secured at its outer end in a boss 58 which is fastened to the outside of the bracket 54. In this manner mirror 18 can be adjusted into a plane (plane P3 in FIG. 1) which is disposed at right angles to each of the planes (P1 and P2) containing mirror 16 and mirror 14.

As a result of the above assembly, the mirrors 14, 16 and 18 operatively function like a corner cube, the reflective surface of each such mirror being positioned in a plane which is normal to each reflective surface of the other two mirrors. Moreover, the rod 53 supports mirror 18 in registry with the rear surface of the screen S, and in such a manner that the image formed on the reflective face of mirror 18 is rotated slightly further, and is transmitted along the axis D, which extends parallel to the axis A onto the rear surface of the screen S. The final rotation of the image which occurs on the mirror 18 effects a complete, 180° resolution of the contour image of the workpiece W, so that the image directed onto the rear surface of screen S, when observed by an observer standing in front of the screen, will portray a contour image which is upright and unreversed with respect to the contour image transmitted along axis A. Notably, this transmission of the contour image from the lens system 12 to the screen S is effected solely by the three mirrors 14, 16 and 18, and without the use of any intervening relay lenses. Moreover, the contour image of the workpiece W, which is reversed by the lens system 12, has been completely resolved or rotated 180° by the time that it reaches screen S, so that it appears thereon as an upright and unreversed contour image, as shown for example in FIG. 1.

From the foregoing it will be apparent that the present invention provides a relatively simple and inexpensive mirror system for a contour projector, which will project an enlarged, but upright and unreversed contour image of a workpiece, and without the need for employing any intervening relay lens systems. Unlike conventional contour projector systems, the mirror system disclosed herein utilizes three progressively larger mirrors which project an image along a path the axis of which does not lie in a common plane containing the optical axis of the magnification lens system 12. On the contrary, each mirror projects an image almost laterally from its reflective surface, but always from a surface which is disposed in a plane normal to the plane of each of the other reflective surfaces in the series. This system functions in a manner similar to that of a corner cube mechanism, but eliminates any possibility of interference, which might otherwise result during the transmission of an image, by virtue of the intersection of part of the image with a seam which frequently exists between adjacent corner cube reflectors. In the present system there is no such seam, since each mirror is spaced from the other, notwithstanding the fact that each mirror is also in a plane normal to the planes of the remaining mirrors. Moreover, it will be noted that the light path followed by the projected image results in the return of the image onto the screen of the projector along the path (axis D) which is parallel to the path (axis A) along which the image is initially projected. This enables the overall length of the equipment to be reduced.

Although the present application illustrates and describes in detail only certain embodiments thereof, it will be apparent that this application is intended to cover any such modifications which may fall within the scope of one skilled in the art or the appended claims.

I claim:

1. In a contour projector having a light source, a lens system, and a work support positioned between said light source and lens system to support a workpiece in position to have a contour image of the workpiece projected by light from said source to the inlet of said lens system, the improvement comprising a simplified mirror system for projecting said image from the outlet of said lens system to the projection screen of said projector, said system including a first mirror having a reflective surface spaced from and registering with the outlet of said lens system to receive the contour image projected thereby, and lying in a first plane inclined to and extending transversely of the axis of said lens system and the contour image projected thereby, a second mirror having a reflective surface spaced from and registering with the reflective surface of said first mirror to receive the contour image reflected thereby, and lying in a second plane extending normal to said first plane, and a third mirror having a reflective surface spaced from and registering with the reflective surface of said second mirror to receive the contour image reflected thereby, and lying in a third plane extending normal to each of said first and second planes, the reflective surface of said third mirror being spaced from and registering with said projection screen of the projector, and being operative to reflect said contour image onto said screen along an axis parallel to the axis of the contour image projected by said lens system, thereby to form on said screen an upright and unreversed image of the contour of said workpiece.

2. A contour projector as defined in claim 1, wherein said first plane is inclined other than at right angles to said axis of said lens system.

3. A contour projector as defined in claim 1, wherein the respective reflective surfaces of said mirrors have progressively larger surface areas commencing with said first mirror through said third mirror.

4. A contour projector as defined in claim 1, wherein each of the reflective surfaces of said first and second mirrors reflects said contour image directly to the next successive reflective surface in said system of mirrors without the use of any intervening lens system.

5. A contour projector as defined in claim 4, wherein said contour image is reflected directly onto said screen from the reflective surface of said third mirror.

6. A contour projector as defined in claim 1, wherein
the image reflected from each of said reflective surfaces is rotated slightly relative to the axis of the image received by a respective reflective surface, and the image projected onto said screen has been rotated a total 180° relative to the image projected from said outlet of the lens system to said first mirror.

7. A contour projector as defined in claim 1, including means supporting said projection screen in a plane disposed at right angles to the axis of said lens system.

8. A contour projector as defined in claim 1, including means mounting said second and third mirrors for adjustment relative to each other and to said first mirror.

9. A contour projector as defined in claim 1, wherein said axis of the contour image reflected onto said screen, and said axis of said lens system lie in a common plane extending normal to and intersecting said projection screen.

* * * * *